US006268800B1

(12) United States Patent
Howard

(10) Patent No.: US 6,268,800 B1
(45) Date of Patent: Jul. 31, 2001

(54) TRAILER JACK-KNIFE ALARM DEVICE

(76) Inventor: Donald Howard, 818 Mayfair St., Blytheville, AR (US) 72315

( * ) Notice: Subject to any disclaimer, the term of this patent is extended or adjusted under 35 U.S.C. 154(b) by 0 days.

(21) Appl. No.: 09/560,898

(22) Filed: Apr. 28, 2000

(51) Int. Cl.[7] ................................. G08B 21/00
(52) U.S. Cl. ............ 340/686.1; 340/431; 340/686.2; 340/687
(58) Field of Search ............... 340/431, 686.1, 340/687, 686.2; 280/432, 457

(56) References Cited

U.S. PATENT DOCUMENTS

| 3,672,702 | * | 6/1972 | Phegley | 280/457 |
| 4,040,006 | * | 8/1977 | Kimmel | 340/52 R |
| 4,271,401 | * | 6/1981 | Meo | 340/431 |
| 4,341,395 | * | 7/1982 | Miller et al. | 28/432 |
| 4,585,248 | * | 4/1986 | Miller et al. | 280/432 |
| 4,784,403 | * | 11/1988 | Hawkins et al. | 280/432 |
| 4,934,727 | * | 6/1990 | Hawkins et al. | 280/432 |
| 5,159,312 | * | 10/1992 | Engle | 340/431 |
| 5,558,351 | * | 9/1996 | Hunter | 280/432 |
| 5,912,616 | * | 6/1999 | Valentino | 340/431 |

* cited by examiner

Primary Examiner—Daniel J. Wu
Assistant Examiner—Phung Nguyen
(74) Attorney, Agent, or Firm—Shlesinger, Arkwright & Garvey LLP

(57) ABSTRACT

A jack-knife alarm device comprises a pivotable first plate and a first switch operably associated with one end of the first plate, the first plate being biased against the first switch to maintain the first switch in an open position; a pivotable second plate and a second switch operably associated with one end of the second plate, the second plate being biased against the second switch to maintain the second switch in an open position; and a circuit operably connected to the first and second switches, the circuit being configured to be connected to an indicator that is activated when one of the first and second switches is in a closed position. The first and second plates are disposed opposite each other at an angle opening toward a trailer being towed and on each side of a trailer hitch ball so that when a trailer tongue hits and depresses an opposite end of one of the first and second plates, the corresponding first or second switch is activated to a closed position to complete the circuit to activate an indicator to warn an operator of a towing vehicle of a potential jack-knife situation with the trailer.

16 Claims, 5 Drawing Sheets

TRAILER JACK-KNIFE ALARM DEVICE

FIELD OF THE INVENTION

The present invention is directed to an alarm device to warn an operator of a vehicle of a potential jack-knife situation with a trailer being towed, and particularly to a jack-knife alarm device that may be installed to a vehicle rear bumper or trailer hitch assembly to provide an alarm when the trailer gets into a potentially damaging jack-knife orientation with the vehicle.

BACKGROUND OF THE INVENTION

Towing a trailer is a skill that requires hours of practice to acquire. When a vehicle operator who has not yet acquired the skill, such as someone who rents a trailer on a weekend to move some large items, tries to tow a trailer, the vehicle and/or trailer may get damaged when the trailer jack-knifes, a situation which occurs when the trailer pivots at a large angle with respect to the vehicle during a backing up operation. It may be too late when the operator realizes the mistake. To prevent such an occurrence, a device is needed to warn the operator of a potential jack-knife situation, thereby avoiding damage to the vehicle and/or trailer.

OBJECTS AND SUMMARY OF THE INVENTION

It is an object of the present invention to provide a jackknife alarm device for use when towing a trailer to alert the driver of the towing vehicle when a potential jack-knife situation develops.

It is another object of the present invention to provide a jack-knife alarm device for use when towing a trailer to prevent possible damage to the towing vehicle or to the trailer by alerting the driver of a potential jack-knife situation before it occurs.

It is still another object of the present invention to provide a jack-knife alarm device for use when towing a trailer that is conveniently packaged to be easily installed to a trailer hitch assembly or to the rear bumper of a towing vehicle.

A jack-knife alarm device comprises a pivotable first plate and a first switch operably associated with one end of the first plate, the first plate being biased against the first switch to maintain the first switch in an open position; a pivotable second plate and a second switch operably associated with one end of the second plate, the second plate being biased against the second switch to maintain the second switch in an open position; and a circuit operably connected to the first and second switches, the circuit being configured to be connected to an indicator that is activated when one of the first and second switches is in a closed position. The first and second plates are disposed opposite each other at an angle opening toward a trailer being towed and on each side of a trailer hitch ball so that when a trailer tongue hits and depresses an opposite end of one of the first and second plates, the corresponding first or second switch is activated to a closed position to complete the circuit to activate an indicator to warn an operator of a towing vehicle of a potential jack-knife situation with the trailer.

The present invention is also directed to a rear bumper of a vehicle, comprising a jack-knife alarm device to alarm an operator of the vehicle of a potential jack-knife situation with a trailer being towed. The bumper includes a central indentation in which the device is disposed.

The present invention is further directed to a towing hitch assembly, comprising a receiver hitch assembly and a jack-knife alarm device to alarm an operator of the vehicle of a potential jack-knife situation with a trailer being towed. The device is secured to the receiver hitch assembly.

These and other objects of the present invention will become apparent from the following detailed description.

BRIEF DESCRIPTIONS OF THE DRAWINGS

DETAILED DESCRIPTION OF THE INVENTION

Figure 1:
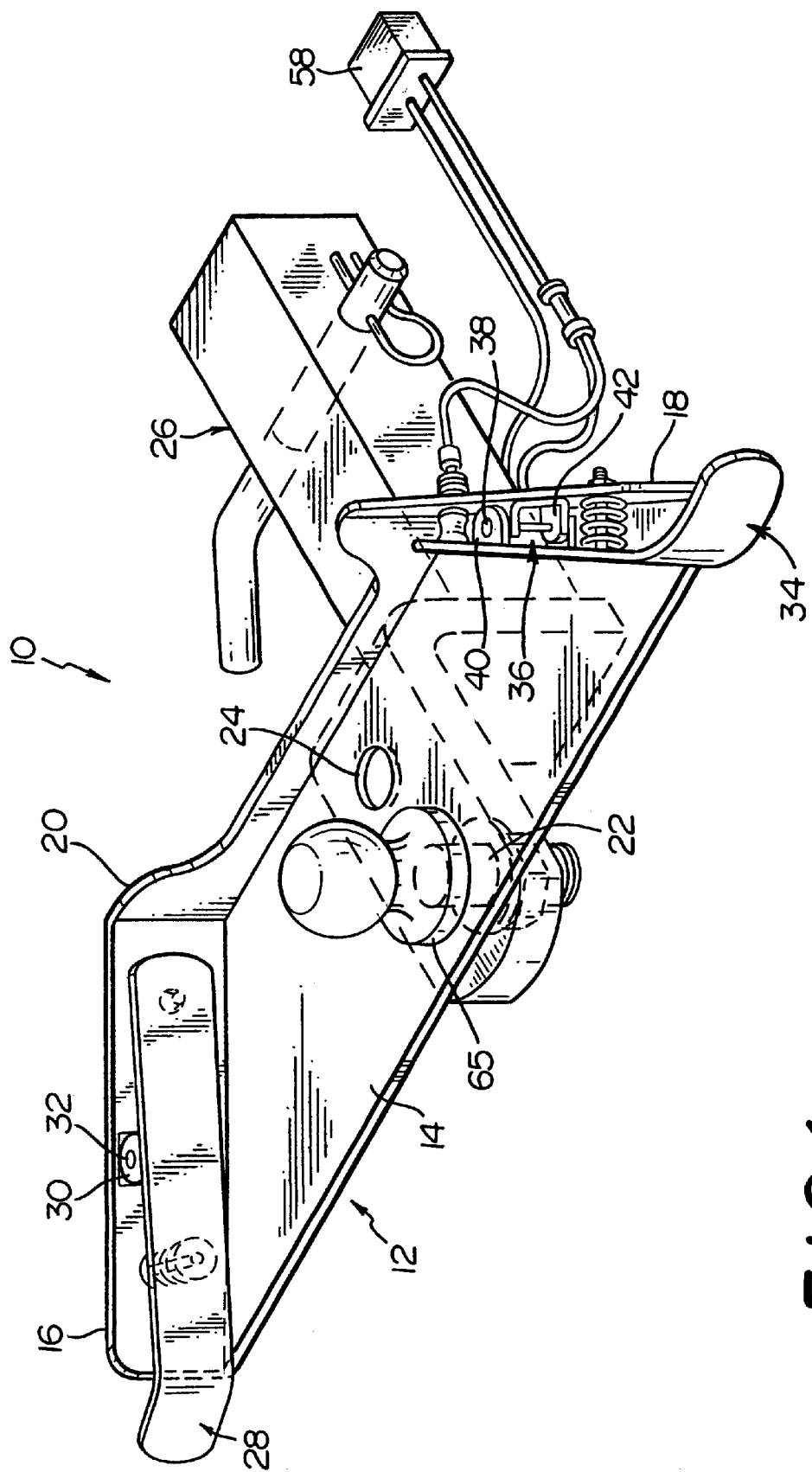
FIG. 1 is a top perspective view of a jack-knife alarm device made in accordance with the present invention.
Figure 2:
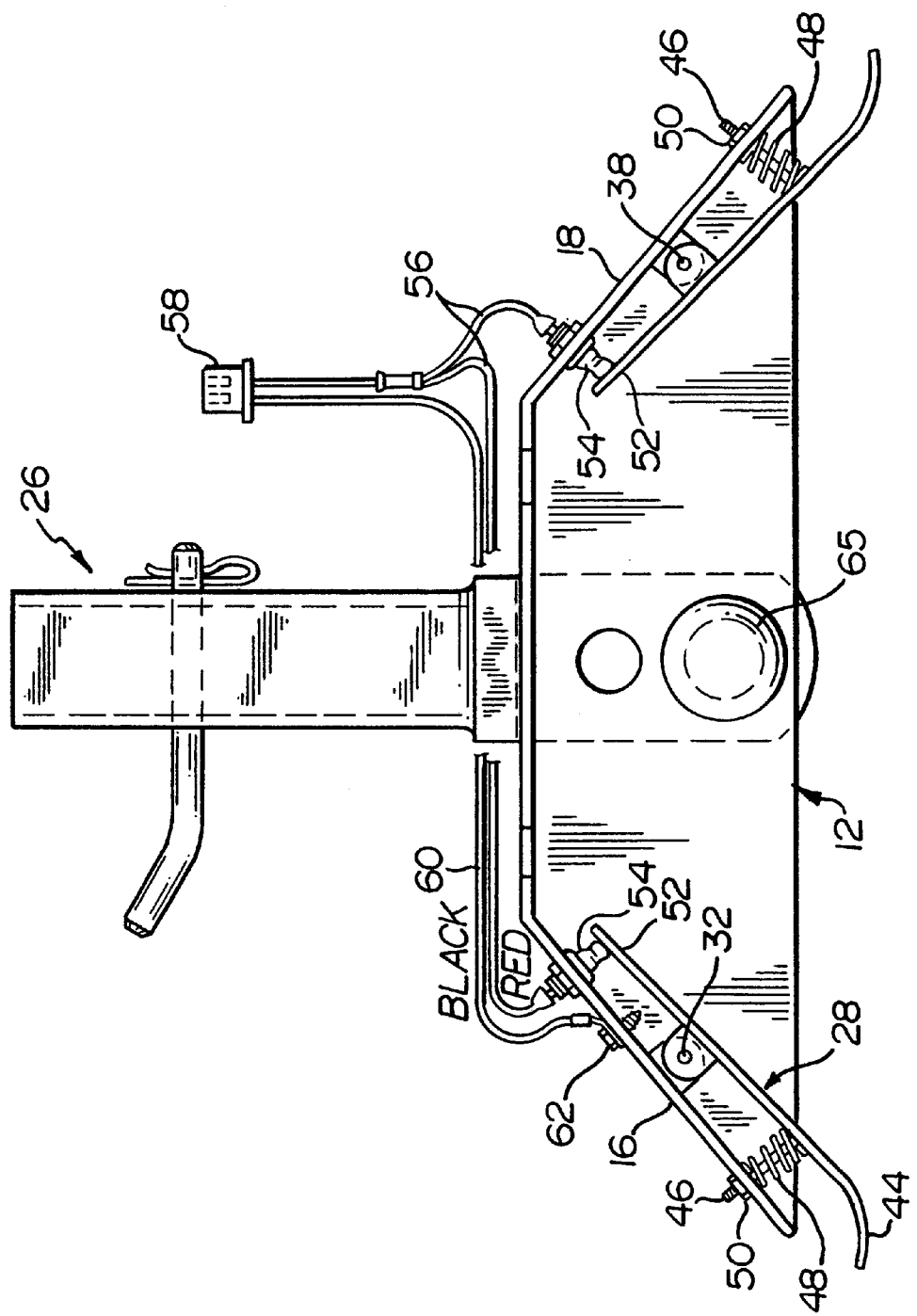
FIG. 2 is a top plan view of FIG. 1.

A jack-knife alarm device 10 made in accordance with the present invention is disclosed in FIG. 1. The device 10 includes a support 12 comprising a base plate 14 and peripheral walls 16, 18 and 20 extending vertically from the base plate. The base plate 14 includes openings 22 and 24 to enable the device 10 to be installed to a receiver hitch assembly 26 or to the rear bumper of the vehicle (see FIG. 4).

A sensor plate 28 is secured at its middle portion in a pivotable manner to the wall 16 by means of a bracket arrangement 30 and a pin 32. Another sensor plate 34 is also pivotably secured at its middle portion to the wall 18 by means of bracket arrangement 36 and a pin 38. Each bracket arrangement 30 and 36 includes a pair of tab members 40 transversely secured to the respective plate 28 and 34 and receives therebetween a U-shaped bracket 42 secured to the respective walls 16 and 18.

Each plate 28 and 34 has an outer end portion 44 bent into an arcuate shape adapted to be engaged by a structure of the trailer being towed when backing up. Each end portions 44 is secured to the respective wall 16 and 18 by a bolt 46 and a spring 48. The bolt 46 moves through the respective hole in wall 16 and 18 carrying with it its respective nut 50 when the end portion 44 is depressed when in use. The spring 48 biases the inner end portion 52 of the respective plate 28 and 34.

A microswitch 54 is secured to each wall 16 and 18 and below the respective end portion 52 of the plates 28 and 34. The spring 48 causes the end portion 52 to apply pressure on the microswitch 54 and maintains it in the open position. Wires 56 connect the microswitches 54 to a plug connector 58. A ground wires 60 is connected to the support 12 with a screw 62 and is terminated at the connector 58.

The connector 58 is to be operably connected by standard wiring means to the vehicle's horn or other indicators adapted to catch the operator's attention. When one of the microswitches 54 is closed, the circuit is completed to activate the horn.

Figure 3:
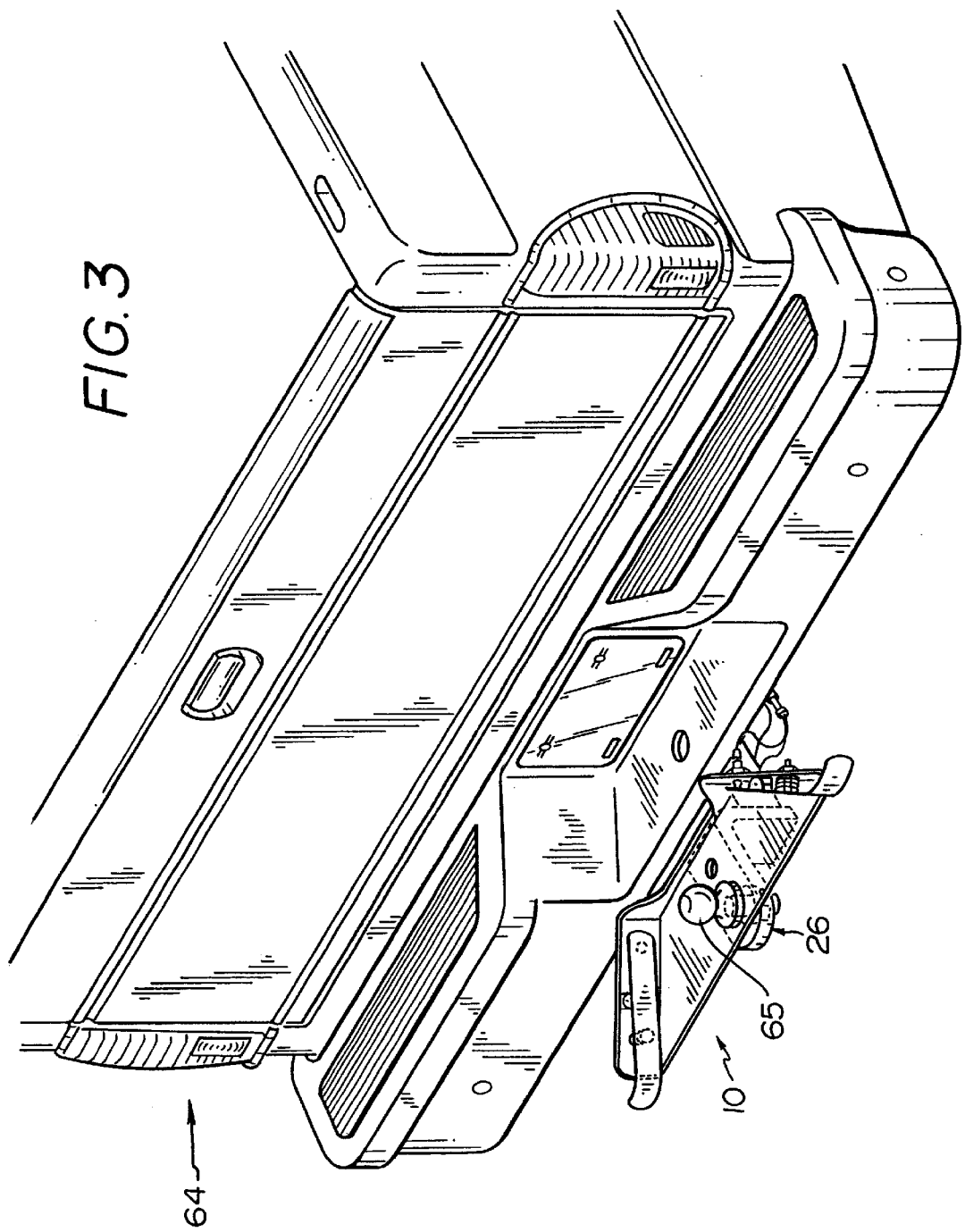
FIG. 3 is a perspective view of the device of FIG. 1 shown attached to a trailer hitch assembly at the back of a towing vehicle.

Referring to FIG. 3, the device 10 is shown installed to a receiver hitch assembly 26 at the rear of the towing vehicle 64. The trailer hitch ball 65 secures the device.

Figure 4:
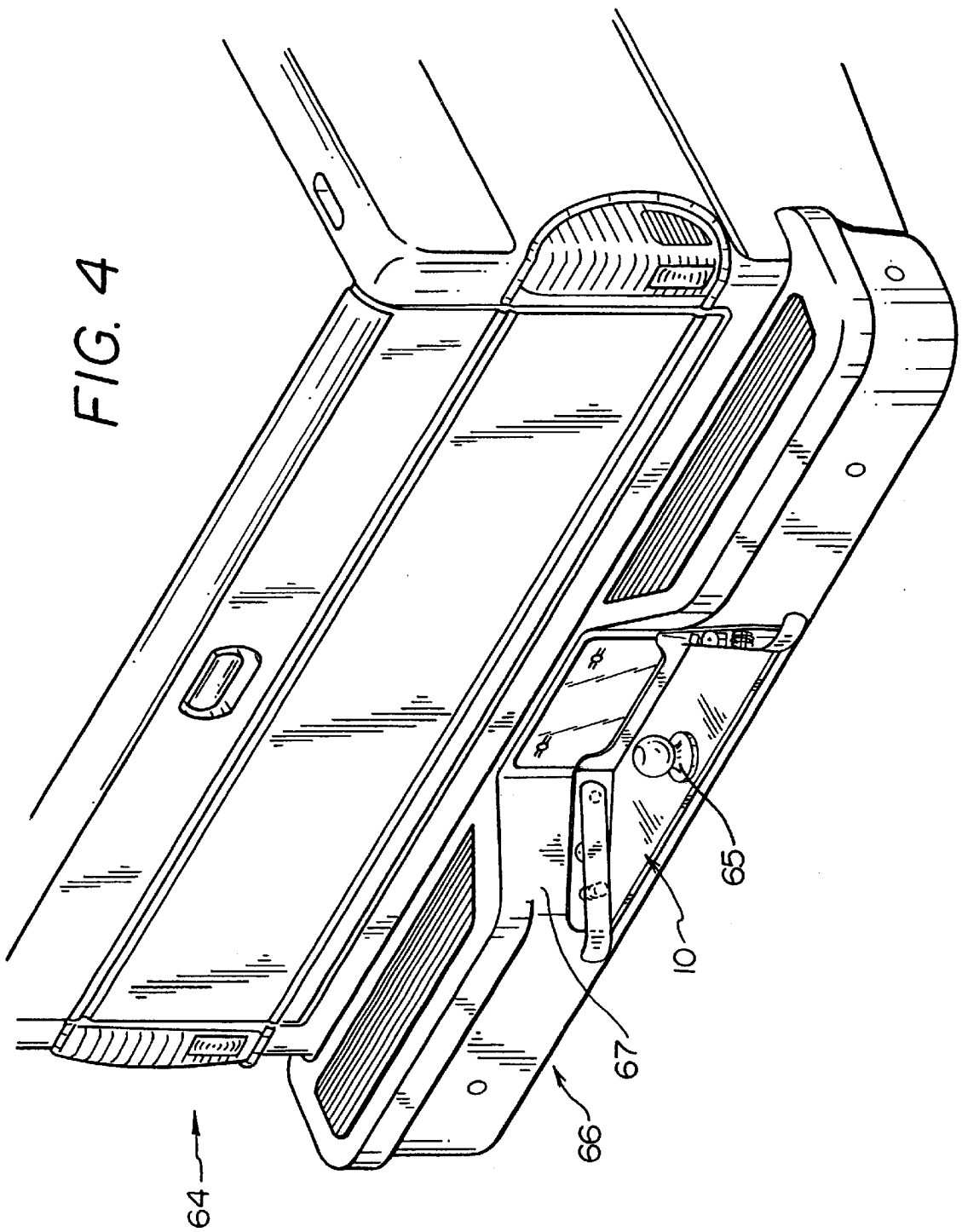
FIG. 4 is perspective view of the device of FIG. 1 shown attached directly to a rear bumper of a towing vehicle.

Referring to FIG. 4, the device 10 is secured to the rear bumper 66 of the vehicle 64. The trailer hitch ball 65 secures the device 10 to the bumper. The rear bumper includes an indentation 67 in which the device 10 is disposed.

Figure 5:
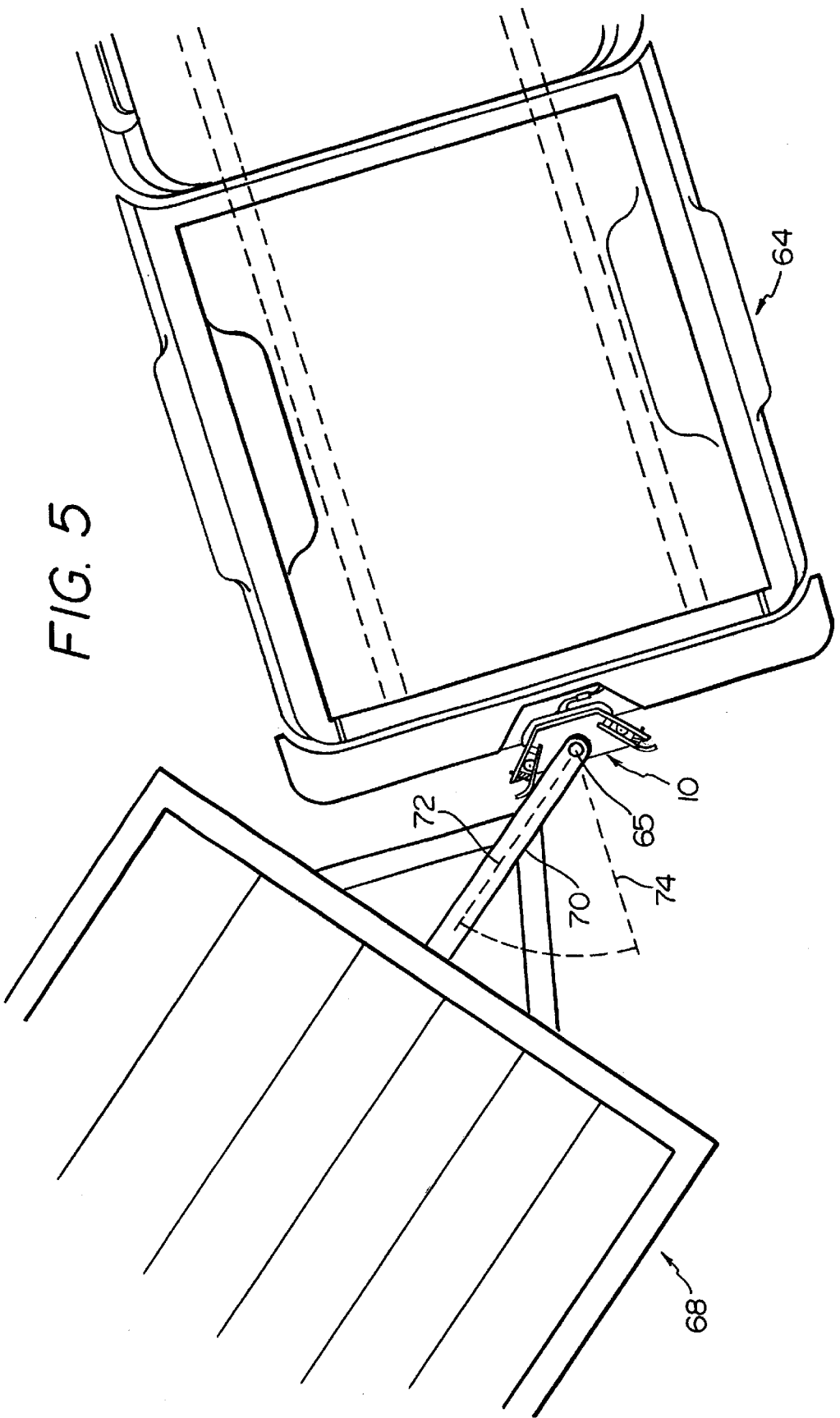
FIG. 5 is a top plan view of a towing vehicle and a trailer secured to a trailer hitch equipped with the device of FIG. 1, showing the towing vehicle and the trailer in a potential jack knife situation.

Referring to FIG. 5, a trailer 68 is shown connected to the rear of the vehicle 64 through the trailer hitch assembly equipped the jack-knife alarm device 10. When the tongue 70 or other structure of the trailer hits and depresses the outer end portion 44 of either of the sensor plates 28 and 34, the respective microswitch 54 is released from the compressive force of the other end portion 52 of the respective plates 28 and 34. The respective microswitch 54 is thus released to the close position, triggering the vehicle's horn or other visual/audible indicators, alarming the driver of a potential jack knife situation. Generally, the alarm is activated when the longitudinal axis of the trailer 72 makes an angle of about 55° with a longitudinal axis 74 of the vehicle. However, it should be understood that different angles may be used, depending on the size of the trailer and the vehicle, the load on the trailer, the specific configuration of the trailer tongue 70, etc.

While this invention has been described as having preferred design, it is understood that it is capable of further modification, uses and/or adaptations following in general the principle of the invention and including such departures from the present disclosure as come within known or customary practice in the art to which the invention pertains, and as may be applied to the essential features set forth, and fall within the scope of the invention or the limits of the appended claims.

I claim:

1. A jack-knife alarm device, comprising:

a) pivotable first plate and a first switch operably associated with one end of said first plate, said first plate is biased against said first switch to maintain said first switch in an open position;

b) pivotable second plate and a second switch operably associated with one end of said second plate, said second plate is biased against said second switch to maintain said second switch in an open position;

c) a circuit operably connected to said first and second switches, said circuit to be connected to an indicator that is activated when one of said first and second switches is in a closed position; and d) said first and second plates are disposed opposite each other at an angle opening toward a trailer being towed and on each side of a trailer hitch ball so that when a trailer tongue hits and depresses an opposite end of one of said first and second plates, the corresponding first or second switch is activated to a closed position to complete said circuit to activate an indicator to warn an operator of a towing vehicle of a potential jack-knife situation with the trailer.

2. A jack-knife alarm device as in claim 1, and further comprising:

a) a support; and b) said first and second plates are secured to said support.

3. A jack-knife alarm device as in claim 2, wherein said first and second switches are secured to said support.

4. A jack-knife alarm device as in claim 2, wherein:

a) said support includes a base and upstanding first and second walls; and b) said first and second plates are secured to the respective first and second walls.

5. A jack-knife alarm device as in claim 4, and further comprising a pin and bracket arrangement to secure said plates to the respective first and second walls.

6. A jack-knife alarm device as in claim 1, wherein said first and second plates include first and second springs, respectively, urging the other end of respective first and second plates toward the respective first and second switches.

7. A jack-knife alarm device as in claim 1, wherein said opposite ends of said plates are curved.

8. A jack-knife alarm device as in claim 1, wherein said first and second switches are connected to a plug connector.

9. A jack-knife alarm device as in claim 1, wherein said first and second switches are microswitches.

10. A jack-knife alarm device as in claim 1, and further comprising means for securing said device to a rear bumper of the vehicle.

11. A jack-knife alarm device as in claim 1, and further comprising means for securing said device to a receiver hitch assembly.

12. A jack-knife alarm device to alarm an operator of a towing vehicle of a potential jack-knife situation with a trailer being towed, comprising:

a) a support for securing to a vehicle;

b) first and second switches operably secured to said support, said switches forming a circuit to be connected to an indicator;

c) first and second pivotable members operably secured to said support, each being disposed opposite each other and forming a "V" opening between each other; and d) each member being pivotable about its intermediate portion, with one end being biased outwardly so that an opposite end is pressed against a respective switch such that when the trailer tongue engages said biased end of said member, the other end of said member is separated from the respective switch thereby to complete said circuit to the indicator.

13. A jack-knife alarm device as in claim 12, wherein:

a) said support includes a base and upstanding first and second walls; and b) said first and second plates are secured to the respective first and second walls.

14. A jack-knife alarm device as in claim 12, wherein said first and second plates include first and second springs, respectively, urging the other end of respective first and second plates toward the respective first and second switches.

15. A jack-knife alarm device as in claim 12, wherein said first and second switches are connected to a plug connector.

16. A jack-knife alarm device as in claim 12, wherein said first and second switches are microswitches.

* * * * *